US006652994B2

(12) United States Patent
Yanagita et al.

(10) Patent No.: US 6,652,994 B2
(45) Date of Patent: Nov. 25, 2003

(54) RADIATION IMAGE CONVERSION PANEL

(75) Inventors: Takafumi Yanagita, Tokyo (JP); Takehiko Shoji, Tokyo (JP); Katsuya Kishinami, Tokyo (JP)

(73) Assignee: Konica Corporation, Tokyo (JP)

( * ) Notice: Subject to any disclaimer, the term of this patent is extended or adjusted under 35 U.S.C. 154(b) by 58 days.

(21) Appl. No.: 09/973,523

(22) Filed: Oct. 9, 2001

(65) Prior Publication Data

US 2002/0070351 A1 Jun. 13, 2002

(30) Foreign Application Priority Data

Oct. 20, 2000 (JP) ....................................... 2000/320786
Oct. 23, 2000 (JP) ....................................... 2000/322571

(51) Int. Cl.$^7$ ................................................ G03B 42/02

(52) U.S. Cl. ....................... 428/690; 428/212; 428/917; 250/284.4; 313/506

(58) Field of Search ................................ 428/690, 917, 428/212; 250/284.4; 313/506

(56) References Cited

U.S. PATENT DOCUMENTS 4,491,736 A * 1/1985 Teraoka ................... 250/484.1
4,501,683 A * 2/1985 Arakawa et al. ....... 252/301.26
5,888,647 A * 3/1999 Yamane ...................... 428/338
5,889,283 A * 3/1999 Yanagita et al. ......... 250/484.2
5,905,014 A * 5/1999 Van de Bergh ............. 430/139
6,262,424 B1 * 7/2001 Yanagita et al. ......... 250/483.1
6,396,066 B1 * 5/2002 Chen et al. .............. 250/488.1

FOREIGN PATENT DOCUMENTS

EP 0 158 862 * 10/1985
JP 03076727 * 4/1991
JP 11344598 * 12/1999

* cited by examiner

*Primary Examiner*—Cynthia H. Kelly
*Assistant Examiner*—Dawn Garrett
(74) *Attorney, Agent, or Firm*—Frishauf, Holtz, Goodman & Chick, P.C.

(57) ABSTRACT

A radiation image conversion panel comprising, (i) a phosphor sheet which contains a support having thereon an stimulating light absorbing layer(A) being colored to absorb the stimulating light, and a stimulable phosphor layer in the order; and (ii) a protecting layer which covers the stimulable phosphor layer of the phosphor sheet, wherein the protective layer comprises a stimulating light absorbing layer(B) being colored to absorb the stimulating light, and the layers(A) and (B) each have a smaller absorbance at a peak wavelength of a stimulated emission than an absorbance at a peak wavelength of the stimulating light, and a thickness of the layer(A) is larger than a thickness of the layer(B).

9 Claims, 2 Drawing Sheets

RADIATION IMAGE CONVERSION PANEL

FIELD OF THE INVENTION

The present invention relates to a radiation image conversion panel employing stimulable phosphors, and specifically to a radiation image conversion panel which results in excellent balance between the emission luminance and the sharpness of said stimulable phosphors.

BACKGROUND OF THE INVENTION

Radiation images such as X-ray images are widely employed for medical diagnoses. Utilized as a method for obtaining X-ray images is so-called radiography in which X-rays, which have passed through an object, are subjected to irradiation onto a phosphor layer (being a fluorescent screen) to result in visible light, which is irradiated onto a silver salt bearing film, in the same manner as conventional photography, and the resulting film is subjected to photographic processing. In recent years, however, a method has been invented in which images are formed directly from a phosphor layer without employing silver salt coated films.

Said method is described, for example, in U.S. Pat. No. 3,859,527 and Japanese Patent Publication Open to Public Inspection No. 55-12144. Specifically, a radiation image conversion panel comprised of stimulable phosphors is utilized, and the stimulable phosphor layer of said radiation image conversion panel is subjected to radiation exposure which has passed through the object being diagnosed so that radiation energy is stored corresponding to the radiation transmittance of each portion of said object. Subsequently, the resulting stimulable phosphor layer is sequentially subjected to stimulation employing electromagnetic waves (stimulating light), such as visible light and infrared rays, so that radiation energy stored in said stimulable phosphor layer is released as stimulated luminescence. Signals of the intensity variation of said stimulated luminescence are subjected, for example, to photoelectric conversion to obtain electrical signals. The resulting electrical signals are employed to reproduce visible images on recording materials such as light-sensitive films or display devices such as a CRT.

The radiation image conversion panel, employing said stimulable phosphors, stores radiation image information and releases stored energy through stimulating light scanning. Therefore, after scanning, it is possible to repeatedly store radiation images so as to be capable of being repeatedly used. Accordingly, compared to radiography in which a combination of conventional radiographic films and intensifying screens is used, it is possible to obtain radiation images with ample information, while utilizing much less radiation exposure. Further, contrary to the fact that in the conventional radiography, radiographic film is consumed for every exposure, said radiation image conversion method is more advantageous from the viewpoint of resource conservation as well as economic efficiency, because it is possible to repeatedly utilize said radiation image conversion panel.

The stimulable phosphors employed in said radiation image conversion panel are those which result in stimulated luminescence after having been subjected to irradiation of stimulating light after said radiation. In practice, phosphors are commonly employed which result in stimulated luminescence in the wavelength range of 300 to 500 nm utilizing stimulating light in the wavelength region of 400 to 900 nm. Herein, examples of stimulable phosphors, which have conventionally been employed in said radiation image conversion panel, are described in Sections (1) through (14) below.

(1) Rare earth element activated alkaline earth metal fluorinated halogen phosphors represented by the composition formula of $(Ba_{1-x}, M^{II+}{}_{x})FX:yA$, described in Japanese Patent Publication Open to Public Inspection No. 55-12145, wherein $M^{II+}$ represents at least one of Mg, Ca, Sr, Zn, and Cd; X represents at least one of Cl, Br, and I; A represents at least one of Eu, Tb, Ce, Tm, Dy, Pr, Ho, Nd, Yb, and Er; "x" and "y" each represent figures satisfying the relationship of $0 \leqq x \leqq 0.6$ and $0 \leqq y \leqq 0.2$, respectively.

Further, said phosphors may comprise additives as described (a) through (n).

(a) X', BeX", $M^{III}X_3$''', described in Japanese Patent Publication Open to Public Inspection No. 56-74175, (wherein X', X" and X''' each represent at least one of CL, Br and I; and $M^{III}$ represents a trivalent metal);

(b) metal oxides described in Japanese Patent Publication Open to Public Inspection No. 55-160078, such as BeO, BgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, and $ThO_2$;

(c) Zr and Sc described in Japanese Patent Publication Open to Public Inspection No. 56-116777;

(d) B described in Japanese Patent Publication Open to Public Inspection No. 57-23673;

(e) As and Si described in Japanese Patent Publication Open to Public Inspection No. 57-23675;

(f) M·L (wherein M represents at least one alkali metal selected from the group of Li, Na, K, Rb, and Cs; L represents at least one trivalent metal selected from the group of Sc, Y, La, Ce, Pr, Nd, Pm, Sm, Gd, Tb, Dy, Ho, Er, Tm, Yb, Lu, Al, Ga, In, and Tl) described in Japanese Patent Publication Open to Public Inspection No. 58-206678;

(g) calcined tetrafluoroboric acid compounds described in Japanese Patent Publication Open to Public Inspection No. 59-27980;

(h) calcined, univalent or divalent metal salt of hexafluorosilic acid, hexafluorotitanic acid or hexafluorozirconic acid, described in Japanese Patent Publication Open to Public Inspection No. 59-27289;

(i) NaX' (wherein X' represents at least one of Cl, Br and I), described in Japanese Patent Publication Open to Public Inspection No. 59-56479;

(j) transition metals such as V, Cr, Mn, Fe, Co, and Ni, described in Japanese Patent Publication Open to Public Inspection No. 59-56479;

(k) $M^{I}X$ ', $M'^{II}X$", $M^{III}X$''' and A, (wherein $M^{I}$ represents at least one alkali metal selected from the group of Li, Na, K, Rb, and Cs; $M'^{II}$ represents at least one divalent metal selected from the group of Be and Mg; $M^{III}$ represents at least one trivalent metal selected from the group of Al, Ga, In, and Tl; A represents a metal oxide; X', X" and X''' each represents at least one halogen atom selected from the group of F, Cl, Br, and I), described in Japanese Patent Publication Open to Public Inspection No. 59-75200;

(l) $M^{I}X'$ (wherein $M^{I}$ represents at least one alkali metal selected from the group of Rb or Cs; and X' represents at least one halogen atom selected from the group of F, Cl, Br, and I), described in Japanese Patent Publication Open to Public Inspection No. 60-101173;

(m) $M^{II}{}'X'_2$,$M^{II}{}'X''_2$, (wherein $M^{II}{}'$ represents at least an alkaline earth metal selected from the group Ba, Sr, or Ca; X' and X" each represents at least one halogen atom selected from the group of Cl, Br, or I, and $X' \neq X''$), described in Japanese Patent Publication Open to Public Inspection No. 61-23679; and (n) $LnX''_3$ (wherein Ln represents at least one rare earth metal selected from the group of Sc, Y, La, Ce, Pr, Nd, Pm, Sm, Gd, Tb, Dy, Ho, Er, Tm, Yb, and Lu; X" represents at least one halogen atom selected from the group of F, Cl, Br, and I), described in Japanese Patent Publication Open to Public Inspection No. 61-264084.

(2) Divalent europium activated alkaline earth metal halide phosphor represented by the composition formula of $M^{II}X_2 \cdot aM^{II}X'_2:xEu^{2+}$ (wherein $M^{II}$ represents at least one alkaline earth metal selected from the group of Ba, Sr, and Ca; X and X' each represent at least one halogen atom selected from the group of Cl, Br, and I; and X≠X'; "a" represents a figure satisfying the relationship of $0 \leqq a \leqq 0.1$ and "x" represents a figure satisfying the relationship and $0 \leqq x \leqq 0.2$), described in Japanese Patent Publication Open to Public Inspection No. 60-84381.

Further, said phosphors may comprise additives as described in (a) through (i) below.

(a) $M^IX'$ (wherein $M^I$ represents at least one alkali metal selected from the group of Rb and Cs; X' represents at least one halogen atom selected from the group of F, Cl, Br, and I), described in Japanese Patent Publication Open to Public Inspection No. 60-166379;

(b) KX", $MgX_2'''$ and $M^{III}X_3''''$ (wherein $M^{III}$ is at least one trivalent metal selected from the group of Sc, Y, La, Gd, and Lu; X", X'" and X"" each represent at least one halogen atom selected from the group of F, Cl, Br, and I), described in Japanese Patent Publication Open to Public Inspection No. 221483;

(c) B described in Japanese Patent Publication Open to Public Inspection No. 60-228592;

(d) oxides such as $SiO_2$ or $P_2O_5$, described in Japanese Patent Publication Open to Public Inspection No. 60-228593;

(e) LiX" and NaX" (wherein X" represents at least one halogen atom selected from the group of F, Cl, Br, and I), described in Japanese Patent Publication Open to Public Inspection No.61-120882;

(f) SiO described in Japanese Patent Publication Open to Public Inspection No. 61-120883;

(g) $SnX_2''$ (wherein X" is at least one halogen atom selected from the group of F, Cl, Br, and I), described in Japanese Patent Publication Open to Public Inspection No. 61-120885;

(h) CsX" and $SnX_2'''$ (wherein X" and X'" each represent at least one halogen atom selected from the group of F, Cl, Br, and I), described in Japanese Patent Publication Open to Public Inspection No. 61-235486; and (i) CsX" and $Ln^{3+}$ (wherein X" represents at least one halogen atom selected from the group of F, Cl, Br, and I; Ln represents at least one rare earth element selected from the group of Sc, Y, Ce, Pr, Nd, Sm, Gd, Tb, Dy, Ho, Er, Tm, Yb, and Lu), described in Japanese Patent Publication Open to Public Inspection No. 61-235487.

(3) Rare earth element activated rare earth oxyhalide phosphors represented by the composition formula of LnOX:xA, (wherein Ln represents at least one of La, Y, Gd, and Lu; X represents at least one of Cl, Br, and I; A represents at least one of Ce and Tb; and "x" represents a figure satisfying the relationship of $0<x<0.1$), described in Japanese Patent Publication Open to Public Inspection No. 55-12144;

(4) Cerium activated trivalent metal oxyhalide phosphors represented by the composition formula of $M^{II}OX:xCe$, (wherein $M^{II}$ represents at least one oxidized metal selected from the group of Pr, Nd, Pm, Sm, Eu, Tb, Dy, Ho, Er, Tm, Yb, and Bi; X represents at least one of Cl, Br, and I; "x" represent a figure satisfying the relationship of $0<x<0.1$), described in Japanese Patent Publication Open to Public Inspection No. 58-69281;

(5) Bismuth activated alkali metal halide phosphors represented by the composition formula of $M^IX:xBi$, (wherein $M^I$ represents at least one alkali metal selected from the group of Rb and Cs; X represents at least one halogen atom selected from the group of Cl, Br, and I; "x" represent a figure satisfying the relationship of $0<x \leqq 0.2$), described in Japanese Patent Application No. 60-70484;

(6) Divalent europium activated alkaline earth metal halophosphate phosphors represented by the composition formula of $M^{II}_5(PO_4)_3X:Eu^{2+}$, (wherein $M^{II}$ represents at least one alkaline earth metal selected from the group of Ca, Sr, and Ba; X represents at least one halogen atom selected from the group of F, Cl, Br, and I; and "x" represents a figure satisfying the relationship of $0<x \leqq 0.2$), described in Japanese Patent Publication Open to Public Inspection No. 60-141783;

(7) Divalent europium activated alkaline earth metal haloborate phosphors represented by the composition formula of $M^{II}_2BO_3X:xEu^{2+}$ (wherein $M^{II}$ represents at least one alkaline earth metal selected from the group of Ca, Sr, and Ba; X is at least one halogen atom selected from the group of Cl, Br, and I; and "x" is a figure satisfying the relationship of $0<x \leqq 0.2$), described in Japanese Patent Publication Open to Public Inspection No. 60 157099;

(8) Divalent europium activated alkaline earth metal halophosphate phosphors represented by the composition formula of $M^{II}_2PO_4X:xEu^{2+}$, (in which $M^{II}$ represents at least one alkaline earth metal selected from the group of Ca, Sr, and Ba; X represents at least one halogen atom selected from the group of Cl, Br, and I; and "x" represents a figure satisfying the relationship of $0<x \leqq 0.2$), described in Japanese Patent Publication Open to Public Inspection No. 60-157100;

(9) Divalent europium activated alkaline earth metal hydrogenated halide phosphors represented by the composition formula of $M^{II}HX:xEu^2$ (wherein $M^{II}$ represents at least one alkaline earth metal selected from the group of Ca, Sr, and Ba; X represents at least one halogen atom selected from the group of Cl, Br, and I; and "x" represents a figure satisfying the relationship of $0<x \leqq 0.2$), described in Japanese Patent Publication Open to Public Inspection No. 60-217354;

(10) Cerium activated rare earth composite halide phosphors represented by the composition formula of $LnX_3 \cdot aLn'X_3':xCe^{3+}$, (wherein Ln and Ln' each represent at least one rare earth element selected from the group of Y, La, Gd, and Lu; X and X' each represents at least one halogen atom selected from the group of F, Cl, Br, and I; X≠X'; "a" represents a figure satisfying the relationship of $0<a \leqq 10.0$; and "x" represents a figure satisfying the relationship of $0<x \leqq 0.2$), as described in Japanese Patent Publication Open to Public Inspection No. 61-21173;

(11) Cerium activated rare earth composite halide phosphors represented by the composition formula of $LnX_3 \cdot aM^IX':xCe^{3+}$ (wherein Ln represents at least one rare earth element selected from the group of Y, La, Gd, and Lu; $M^I$ represents at least one alkali metal selected from the group of Li, Na, K, Cs, and Rb; X and X' each represents at least one halogen atom selected from the group of Cl, Br, and I; "a" represents a figure satisfying the relationship of $0<a \leqq 10.0$; and "x" represents a figure satisfying the relationship of $0<x \leqq 0.2$), described in JP-A 61-21182;

(12) Cerium activated rare earth halophosphate phosphors represented by the composition formula of $LnPO_4 \cdot aLnX_3:xCe^{3+}$ (wherein Ln represents at least one rare earth element selected from the group of Y, La, Gd, and Lu; X represents at least one halogen atom selected from the group of F, Cl, Br, and I; "a" represents a figure satisfying the relationship of $0<a\leqq 10.0$; and "x" represents a figure satisfying the relationship of $0<x\leqq 0.2$), described in Japanese Patent Publication Open to Public Inspection No. 61-40390;
(13) Divalent europium activated cesium rubidium halide phosphors represented by the composition formula of $CsX:aRbX':xEu^2$ (wherein X and X' each represents at least one halogen atom selected from the group of Cl, Br, and I; "a" represents a figure satisfying the relationship of $0<a\leqq 10.0$; and "x" represents a figure satisfying the relationship of $0<x\leqq 0.2$), described in Japanese Patent Publication Open to Public Inspection No. No. 61-236888;
(14) Divalent europium activated composite halide phosphors represented by the formula of $M^{II}X_2 \cdot aM^{I}X':xEu^{2+}$ (wherein $M^{II}$ represents at least one alkaline earth metal selected from the group of Ba, Sr, and Ca; $M^{I}$ represents at least one alkali metal selected from the group of Li, Rb, and Cs; X and X' each represent at least one halogen atom selected from the group of Cl, Br, and I; "a" represents a figure satisfying the relationship of $0<a\leqq 10.0$; and "x" represents a figure satisfying the relationship of $0<x\leqq 0.2$), described in Japanese Patent Publication Open to Public Inspection No. No. 61-236890.

Of said stimulable phosphors, iodide-containing divalent europium activated alkaline earth metal fluorohalide phosphors, iodide-containing divalent europium activated alkaline earth metal halide phosphors, iodide-containing rare earth element activated rare earth oxyhalide phosphors, and iodide-containing bismuth activated alkaline metal halide phosphors are materials which result in high stimulated luminescence.

In a method employing such stimulable phosphors, it is preferable to achieve durable performance over a long period of time without deteriorating the image quality of radiation images obtained utilizing said radiation image conversion panel. However, stimulable phosphors, employed to produce said radiation image conversion panel, commonly are very hygroscopic. As a result, when set aside in a room under normal weather conditions, deterioration proceeds markedly over an elapse of time.

Specifically, for instance, when a stimulable phosphor layer is set aside in a high humidity atmosphere, the radiation sensitivity of said stimulable phosphor decreases along with an increase in absorbed moisture. Further, latent images recorded onto said stimulable phosphor layer generally fade along with an elapse of time after radiation exposure. As a result, as the time from radiation exposure to scanning, increases utilizing stimulating light, radiation image signals decrease. Accordingly, when said stimulable phosphor layer absorbs moisture, the rate of image fade increases, whereby reproducibility of regenerative signals is degraded during reading of radiation images.

Therefore, in order to minimize degradation of said stimulable phosphor layer due to moisture absorption, a method is employed in which said stimulable phosphor layer is covered with a moisture resistant protective layer with low moisture permeability so that moisture reaching said stimulable phosphor layer decreases. Employed as said moisture resistant protective layers are a polyethylene terephthalate (PET) film and a metalized film in which a thin layer comprised of metal oxides and silicone nitride is formed through vacuum evaporation.

When said radiation image conversion panel is employed, a laser beam with a high beam convergence is commonly employed as the light source of the stimulating light of a stimulable phosphor plate. Therefore, when scanning is carried out employing a laser beam via the protective layer comprised of a polymer film such as PET, there occur scattering of the stimulating laser beam in the interior of said protective film, and the diffused reflection of the stimulating laser beam between said protective layer and the beam detection device, and in peripheral members. As a result, the stimulable phosphor surface away from the location, wherein the stimulating light is scanned, is subjected to excitation, whereby stimulated luminescence is generated, and as a result, sharpness is degraded. Further, in the case in which said protective layer is not formed on the phosphor plate, problems have occurred in which high sharpness is not obtained due to the diffused reflection of the stimulating laser beam between the phosphor plate surface and the beam detection device, as well as in peripheral members.

Specifically, stretched films, such as polyethylene terephthalate film and polyethylene naphthalate film, exhibit excellent physical properties as the protective layer from the aspect of transparency, barrier properties, and strength. On the other hand, due to their high refractive index, some of the stimulating light incident into the interior of the protective film is repeatedly reflected at the upper and lower surfaces of the film. As a result, stimulated luminescence is generated at positions away from the scanned position due to propagation of said stimulating light, whereby sharpness is degraded. Furthermore, the stimulating light reflected in the direction opposite the phosphor surface in the upper and lower surfaces of the protective layer is also repeatedly reflected between light detection devices as well as in peripheral members, whereby the stimulable phosphor layer farther away from the scanned position is stimulated to generate stimulated luminescence. As a result, sharpness is further degraded.

Said stimulating light is a coherent light of relatively long wavelengths, from red to infrared. Therefore, as long as scattered light as well as reflection light is not sufficiently absorbed, the amount of light absorbed by the interior of the protective film and the space of the interior of the reading device decreases. Thus, said stimulating light is propagated to relatively distant positions, resulting in the degradation of sharpness. Further, when said polyethylene terephthalate film as well as said polyethylene naphthalate film is employed as the protective layer, problems also occur resulting in unevenness, except for the radiation images of the objects, that is, image unevenness and linear noise which is assumed to have been formed during the production of the protective layer.

Japanese Patent Publication Open to Public Inspection No. 59-23400 and Japanese Patent Publication 1-57759 disclose means to minimize said image unevenness as well as said linear noise by increasing the haze ratio of the protective layer. However, when the haze ratio is increased, problems occur in which sharpness is degraded. Further, in order to minimize such sharpness degradation, it is noted that the thickness of the protective film is preferably decreased to shorten the propagation distance of the stimulating light in the interior of the protective film. However, this method results in small desired effects and by contrast, problems occur in which moisture resistance as well as abrasion resistance is degraded due to a decrease in the thickness of the protective layer.

Further, regarding improvement of sharpness, Japanese Patent Publication No. 59-23400 discloses a method in which any of the support, the sublayer, the phosphor layer, the interlayer, and the protective layer of a radiation image conversion panel is tinted with color absorbing stimulating light, while Japanese Patent Publication Open to Public Inspection No. 60-200200 discloses a method in which the adhesive agent layer between the phosphor layer and the protective layer is tinted. However, when the sharpness is enhanced employing said methods, problems occur in which said image unevenness as well as said linear noise is more pronounced. When said sharpness decreases or said image unevenness as well as said linear noise is pronounced, the radiation image conversion panel, which is utilized for medical diagnoses, results in critical drawbacks.

SUMMARY OF THE INVENTION

From the viewpoint of said problems, the present invention was achieved. An objective of the present invention is to provide a radiation image conversion panel capable of minimizing degradation of sharpness due to light scattering and diffused reflection of the stimulating laser beam, as well as being capable of enhancing luminance.

In order to achieve said objectives, a radiation image conversion panel is constituted as described below. In said radiation image conversion panel which comprises a support having thereon a stimulable phosphor layer via a reflective layer as well as a sublayer, and also having a protective layer on said stimulable phosphor layer, and releases, as stimulated luminescence, radiation energy absorbed by said stimulable phosphor utilizing a stimulating light, each of said sublayer and said protective layer is comprised of a stimulating light absorbing layer comprising colorants which absorb said stimulating light, and the content of said colorants is adjusted so that the reflection absorbance of said stimulating light in the laminated member, comprised of said reflective layer and said sublayer, exceeds the transmission absorbance of said stimulating light in said protective layer.

Further, the present invention is constituted as described below. In the radiation image conversion panel which comprises a reflection function bearing support, comprised of numerous air bubble containing polyethylene terephthalate, having thereon a stimulable phosphor layer via a sublayer, and also having a protective layer on said stimulable phosphor layer, and releases as stimulated luminescence radiation energy absorbed by said stimulable phosphor layer utilizing stimulating light, each of said sublayer and said protective layer is comprised of a stimulating light absorbing layer comprising a colorant, which absorbs said stimulating light at a specified ratio, and the content of said colorant is adjusted so that the reflection absorbance, of said stimulating light in a laminated member comprised of said support and said sublayer, exceeds the transmission absorbance of stimulating light in said protective layer.

In the present invention, it is preferable that any one of structures described below be employed: a structure in which said protective layer includes said stimulating light absorbing layer in its interior, a structure in which said stimulating light absorbing layer is applied onto at least one surface of a resinous film utilized as the substrate, and a structure in which said colorant is incorporated into said resinous film.

Further, in the present invention, it is preferable that said colorant be selected so that the absorbance of said colorant in the stimulating light average wavelength region exceeds the absorbance in the stimulated luminescence average wavelength region.

Still further, the present invention may be constituted in such a manner that the thickness of said stimulable phosphor layer is set at no more than approximately 250 μm and preferably no more than approximately 230 μm, and said stimulable phosphor is comprised of a material having Eu activated BaFI as the main component.

Preferable embodiments of the present invention are exemplified as follows.

1. A radiation image conversion panel comprising,
   (i) a phosphor sheet which contains a support having thereon an stimulating light absorbing layer(A) being colored to absorb the stimulating light, and a stimulable phosphor layer in the order; and
   (ii) a protecting layer which covers the stimulable phosphor layer of the phosphor sheet,
      wherein the protective layer comprises a stimulating light absorbing layer(B) being colored to absorb the stimulating light, and the layers(A) and (B) each have a smaller absorbance at a peak wavelength of a stimulated emission than an absorbance at a peak wavelength of the stimulating light, and a thickness of the layer(A) is larger than a thickness of the layer(B).

2. The radiation image conversion panel of item 1, further comprising a reflective layer between the support and the stimulating light absorbing layer(A).
3. The radiation image conversion panel of item 1, wherein the support is made of foamed polyethylene terephthalate.
4. The radiation image conversion panel of item 2, wherein (i) a sum of a light reflectivity of a section having the reflective layer and the stimulating light absorbing layer(A) at the peak wavelength of the stimulating light is 50 to 97% of the light reflectivity of the reflective layer; and (ii) the thickness of the reflective layer is between 2 and 50 μm.
5. The radiation image conversion panel of item 1, wherein a light transmittance of a section having the protecting layer comprising the stimulating light absorbing layer(B) at the peak wavelength of the stimulating light is 50 to 97% of the light transmittance of the protecting layer(B).
6. The radiation image conversion panel of item 1, wherein the stimulable phosphor layer comprises BaFI activated with Eu.
7. The radiation image conversion panel of item 1, wherein a haze ratio of the protecting layer is 5 to 60%.
8. The radiation image conversion panel of item 5, wherein the stimulable phosphor layer comprises BaFI activated with Eu.
9. The radiation image conversion panel of item 2, wherein the stimulating light absorbing layer(A) is a sublayer of the stimulable phosphor layer and a reflected absorbance of the stimulating light in a section comprising the reflective layer and the sublayer is larger than a transmission absorbance of the stimulating light in the protective layer.
10. The radiation image conversion panel of item 3, wherein the stimulating light absorbing layer(A) is a sublayer of the stimulable phosphor layer and a reflected absorbance of the stimulating light in a section comprising the reflective layer and the sublayer is larger than a transmission absorbance of the stimulating light in the protective layer.
11. The radiation image conversion panel of item 9, wherein a second stimulating light absorbing layer is contained in the protective layer or the second stimulating light absorbing layer is provided on one side of the support, or the support is colored to absorb the stimulating light.
12. The radiation image conversion panel of item 1, wherein a ratio of an absorbance in the range of an average wavelength of the stimulated light to an average wavelength of the stimulated emission is not less than 3.

By constituting the present invention as described above, it is possible to enhance both luminance and sharpness while balancing the absorption of the stimulating light and the stimulated luminescence in the sublayer as well as in the protective layer.

BRIEF DESCRIPTION OF THE DRAWINGS

11: Stimulable phosphor layer
12: Stimulating light absorbing layer
13: Reflective layer
14: Support
15: Laminated protective layer
16: Foamed polyethylene terephthalate support

DETAILED DESCRIPTION OF THE INVENTION

The radiation image conversion panel according to one embodiment of the present invention will now be described with reference to FIG. 2.

Figure 2:
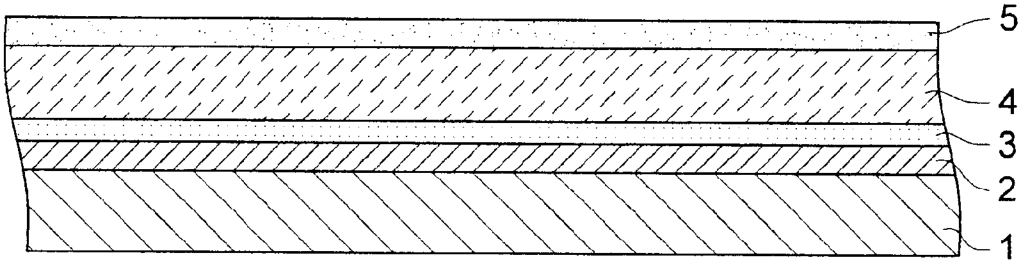
FIG. 2 is another schematic cross-sectional view showing a structure of the radiation image conversion panel according to one embodiment of the present invention.

As shown in FIG. 2, the radiation image conversion panel of the present embodiment is constituted as described below. On support 1, stimulable phosphor layer 4 is formed via reflective layer 2 and sublayer 3. The surface of said stimulable layer 4 is covered with protective layer 5. Further, said sublayer 3 as well as said protective layer 5 is tinted with specified colorants to minimize problems in which a stimulating light such as a laser beam is absorbed by the stimulable phosphor layer at unintended positions due to propagation by scattering and diffused reflection, and stimulated luminescence from the stimulable phosphor is absorbed by other members to result in a decrease in luminance. Further, the tinting degree is adjusted so that the absorbance of each layer of the stimulating light satisfies the specified relationship.

The stimulable light absorbing layer above the phosphor sheet is called A, and the stimulable light absorbing layer in the protective layer is called B in the specification.

The stimulable light absorbing layers A and B each can be in a form of a mono layer or multiple layers. The multiple layers A and B may be set in adjacently, or in a separate position. "The thickness of the layer is larger than the thickness of the layer B" is a condition of the sum of each of the thickness satisfies.

The density of the layer A and the density of the layer B is preferably satisfy the following condition:

The absorbance (%) of the layer B$\leqq$The absorbance of the layer A (%). The absorbance (%) can be obtained by (100−Trasmittance).

The ratio of the density of the layer A to the density of B is preferably between 1:1 to 20:1, and more preferably, between 1:1 to 10:1. The adequate balance between the sharpness and the luminance can be achieved by setting to this range.

The volume of the foam contained in the support is preferably between 5 to 80 volume % of the support, and more preferably between 10 to 60 volume %.

The thickness of the reflective layer is preferably between 10 to 300 $\mu$m.

The thickness of the stimulable light absorbing layers is preferably between 0.5 to 50 $\mu$m.

The thickness of the protective layer is between 5 to 100 $\mu$m.

Each member constituting the radiation image conversion panel of the present embodiment will now be described.

Various types of polymer materials are employed as support 1. From the viewpoint of handling information recording materials, flexible sheets or those capable of being machined into a web are suitable. From this viewpoint, preferred are plastic films such as cellulose acetate film, polyester film, polyethylene terephthalate film, polyethylene naphthalate film, polyamide film, polyimide film, triacetate film, and polycarbonate film.

Incidentally, though the thickness of these supports varies depending on the materials used, it is generally from about 80 to about 1,000 $\mu$m, and from the viewpoint of ease of handling, it is preferably from about 80 to about 500 $\mu$m. These supports may have a smooth surface or a matt surface to enhance adhesion with the stimulable phosphor layer.

Sublayer 3 may be a tinted film which is laminated onto support 1, or a tinted resin, which is applied onto the same. Among these, a tinted resinous film comprising colorants is preferred. Sublayer 3 is preferably constituted by applying any of polyester based, polyurethane based, acryl based, polyvinyl butyral based, or epoxy based resins onto support 1.

Stimulable phosphor layer 4 is formed on said sublayer 3. The sublayer is a layer which is located between the stimulable phosphor layer and the support, which is used to adhere the phosphor layer and the support, or the phosphor and the laminate having multiple layer on the support. Examples of binders employed in said stimulable phosphor layer 4 include proteins such as gelatin, polysaccharides such as dextran, natural polymers such as gum Arabic, and synthetic polymers such as polyvinyl butyral, polyvinyl acetate, nitrocellulose, ethylcellulose, vinylidene chloride-vinyl chloride copolymers, polyalkyl acrylate, polyalkyl methacrylate), vinyl chloride-vinyl acetate copolymers, polyurethane, cellulose acetate butyrate, polyvinyl alcohol, and linear polyesters.

Of these, most preferred are nitrocellulose, linear polyester, polyalkyl acrylate, polyalkyl methacrylate, mixtures of nitrocellulose and linear polyesters, mixtures of nitrocellulose and polyalkyl acrylate or polyalkyl methacrylate, and mixtures of polyurethane and polyvinyl butyral. Further, these binders may be subjected to cross-linking employing bridging agents.

A method for forming stimulable phosphor layer 4 will now be described. Initially, suitable solvents are added to stimulable phosphors and said binders, and the resulting mixture is well blended, whereby a coating composition is prepared in which phosphor particles as well as said compound particles are uniformly dispersed into said binder solvents. Further, said binders are generally employed in an amount ranging from 0.01 to 1 part by weight per part by weight of said stimulable phosphors. However, from the viewpoint of sensitivity and sharpness of the obtained radiation image conversion panel, only minimal binders are preferably employed. To facilitate ease of coating, the preferred range is from 0.03 to 0.2 part by weight per part by weight of said stimulable phosphor. Further, a stimulable phosphor layer coating composition is prepared employing any of the common homogenizers such as a ball mill, a sand mill, an attritor, a three-pole mill, a high-speed impeller homogenizer, a Kady mill, and an ultrasonic homogenizer.

Listed as examples of solvents, employed to prepare said stimulable phosphor layer 4 coating composition, are lower alcohols such as methanol, ethanol, isopropanol, and n-butanol; ketones such as acetone, methyl ethyl ketone, methyl isobutyl ketone, and cyclohexanone; esters of lower fatty acids and lower alcohols such as methyl acetate, ethyl acetate, and n-butyl acetate; ethers such as dioxane, ethylene glycol monoethyl ether and ethylene glycol monomethyl ether; aromatic compounds such as triol and xylol; halogenated hydrocarbons such as methylene chloride and ethylene chloride; and mixtures thereof.

Further, various additives such as dispersing agents to enhance the dispersion of said stimulable phosphors in said coating composition, and plasticizers to enhance a bonding force between binders and phosphors in the resulting stimulable phosphor layer 4 may be incorporated into said coating composition. Listed as examples of dispersing agents employed for said purpose may be phthalic acid, stearic acid, caproic acid, and oleiophilic surface active agents. Listed as examples of plasticizers are phthalic acid esters such as triphenyl phosphate, cresyl phosphate, and diphenyl phosphate; phthalic acid esters such as dimethoxyethyl phthalate; glycolic acid esters such as ethyl phthalyl ethyl glycolate and butyl phthalyl butyl glycolate; polyesters of polyethylene glycol with aliphatic dibasic acids such as polyester of triethylene glycol with adipic acid and polyester of diethylene glycol with succinic acid.

The coating composition prepared as above is uniformly coated onto the surface of the sublayer, whereby a coating composition layer is formed. Said coating is carried out employing conventional coating means such as a doctor blade, a roll coater, and a knife coater. The resulting coating is dried through gradual heating, whereby the formation of said stimulable phosphor layer 4 on the sublayer is completed.

The thickness of said stimulable phosphor layer 4 varies depending on the target characteristics of the radiation image conversion panel, the types of stimulable phosphors, and the mixing ratio of binders to stimulable phosphors. However, said thickness is preferably in the range of 10 to 1,000 μm, and is more preferably in the range of 10 to 250 μm.

Subsequently, protective layer 5 is formed to cover said stimulable phosphor layer 4. Employed as said protective layer 5 may be polyester film, polymethacrylate film, nitrocellulose film, and cellulose acetate film, provided with a stimulating light absorbing layer at a haze ratio of 5 to 60 percent, determined by the method described in ASTMD-1003. Of these, from the viewpoint of transparency as well as strength, stretched films such as polyethylene terephthalate film and polyethylene naphthalate film are preferred, and from the aspect of moisture resistance, metalized films are specifically preferred, which are obtained by applying a thin layer comprised of metal oxides or silicone nitride onto said polyethylene terephthalate film or polyethylene naphthalate film through vacuum evaporation.

Furthermore, in order to satisfy required moisture resistance, optimal moisture resistance is obtained by laminating a plurality of resinous films and metalized films obtained by vacuum-evaporating metal oxides onto said resinous film. In order to minimize degradation of stimulable phosphors due to moisture absorption, it is preferable to achieve no more than 50 $g/m^2\cdot day$. The moisture a absorption can be measured based on the measuring method defined by JIS Z 0208 entitled as Testing Method for Determination of the Water Vapor Transmission Rate of Moisture-Proof Packaging Materials. The definition is as follows: The water vapor transmission rate is the quantity of vapor passing through the unit area of filmy substance for the definite hour. In this standard, when constituting the boundary surface by the moisture-proof packaging materials at the temperature of 25° C. or 40° C., and keeping the air of one side at a relative humidity of 90% and the air of the other side at the dry state by moisture absorbent, the value having converted the mass (g) passing through this boundary surface for 24 hours into the value per 1 $m^2$ shall be defined as the water vapor transmission rate.

The moisture absorbance is preferably 0 $g/m^2$ 2 days. Employed as methods for laminating resinous films may be any of the ones generally known. Further, when laminated, by providing a stimulating light absorbing layer between laminated films, said stimulating light absorbing layer is protected from physical impact as well as chemical modification, whereby it is possible to maintain stable plate performance over a relatively long period of time. Incidentally, said stimulating light absorbing layer may be provided at a plurality of positions and an adhesive layer employed for lamination may comprise colorants so as to be employed as the stimulating light absorbing layer.

When a phosphor plate is sealed employing a protective film, it is possible to employ any of the several conventionally known methods such as a phosphor sheet which is interposed between moisture resistant protective films and the peripheral edge of which is subjected to lamination under application of heat and pressure employing an impulse sealer, and lamination is carried out between rollers under application of heat and pressure. By employing a heat fusible resinous film as the resinous layer of the outermost layer in contact with the phosphor sheet of the moisture resistant protective film, the moisture resistant protective film is fused, whereby the efficiency of sealing work of the phosphor sheets is enhanced. The moisture resistant protective film is preferably provided on both sides of the phosphor sheet and the peripheral edge of said moisture resistant protective films, which is located beyond the peripheral edge of said phosphor sheet, is fused to result in a sealed structure, whereby it is possible to prevent infusion of water from the outside. Further, the moisture resistant protective film on one side of the support may be laminated with at least one aluminum film. By employing such a support, it is possible to assure minimal water infusion.

Further, said heat fusion, which is carried out employing an impulse sealer, is preferably performed under reduced pressure to minimize the displacement of the phosphor sheet in the moisture resistant protective film and to remove moisture from the atmosphere. Still further, the phosphor surface may or may not be allowed to come into contact with the heat fusible resinous layer of the outermost layer on the side in contact with the phosphor surface of the moisture resistant protective film. The non-contact state, as described herein, refers to the state in which the phosphor surface and the moisture resistant protective film are optically and mechanically handled mostly as discontinuous body, even though they may come into "point" contact. Further, the heat fusible film, as described herein, refers to the resinous films which are fusible in the generally used impulse sealer, and include, for example, ethylene-vinyl acetate copolymers (EVA), polypropylene (PP) film, and polyethylene (PE) film. However, the present invention is not limited to these examples.

Incidentally, it is possible to readily adjust the haze ratio of said protective film by selecting the haze ratios of employed resinous films. It is also possible to readily procure resinous films with the desired haze ratio. The protective film of the radiation image conversion panel is required to optically exhibit very high transparency. As materials for such high transparent protective films, various types of plastic films having a haze ratio in the range of 2 to 3 percent are commercially available.

In the present embodiments, protective layer 5 is tinted so as to absorb stimulating light. The structure of said tinted protective layer 5 is not limited to one in which a layer comprised of colorants, which selectively absorb said stimulating light, is incorporated in its interior. Further, structures may be employed in which colorants are applied onto one or both surfaces of the resinous film, which is employed as the substrate of said protective layer 5, or in which the protective layer resinous film itself is tinted.

Employed as colorants used in said protective layer 5 are those which exhibit properties absorbing a stimulating light in the wavelength region of the stimulating light of said radiation image conversion panel. The stimulating light absorbing layer is preferably provided with a protective layer so that the light transmittance of the stimulating light absorbing layer with the protective layer in the wavelength region of the stimulating light is from 50 to 97 percent of the light transmittance of the same protective layer having no stimulating light absorbing layer. When said light transmittance is over 97 percent, the obtained effects of the present invention are small, and when said light transmittance is less than 50 percent, it often occurs a sudden decrease in the luminescence of said radiation image conversion panel. It is assumed that no appreciable decrease in luminescence at a transmittance of 50 percent or more relates to the fact that radiation image information recorded in said radiation image conversion panel is localized on the surface side of the phosphor plate.

The type of employed colorants is determined depending on the type of stimulable phosphors employed in the radiation image conversion panel. Employed as stimulable phosphors for the radiation image conversion panel are, for example, phosphors which result in stimulated luminescence in the wavelength range of 300 to 500 nm, utilizing stimulating light in the wavelength region of 400 to 900 nm. Accordingly, employed as colorants are the blue to green organic or inorganic colorants described below.

Listed as examples of said blue to green organic colorants are Zapon First Blue 3G (manufactured by Hoechst AG), Estrol Brill Blue N-3RL (manufactured by Sumitomo Kagaku Co., Ltd.), Sumiacryl Blue F-GSL (Sumitomo Kagaku Co., Ltd.), D & C Blue No. 1 (manufactured by National Aniline AG), Spirit Blue (manufactured by Hodogaya Kagaku Co., Ltd.), Oil Blue No. 603 (manufactured by Orient Co., Ltd.), Kiton Blue A (manufactured by Ciba-Geigy Co.), Aizen Cathilon Blue GLH (manufactured by Hodogaya Kagaku Co., Ltd.), Lake Blue A, F, H (Kyowa Sangyo Co., Ltd.), Rodarin Blue 6GX (Kyowa Sangyo Co., Ltd.), Primocyanine 6GX (manufactured by Inahata Sangyo Co., Ltd.), Brillacid Green 6BH (manufactured by Hodogaya Kagaku Co., Ltd.), Cyanine Blue BNRS (Toyo Ink Co., Ltd.), and Lionol Blue SL (manufactured by Toyo Ink Co., Ltd.).

Further, listed as examples of blue to green inorganic colorants are ultramarine blue, cobalt blue, cerulean blue, chrome oxide, and $TiO_2$—ZnO—CoO—NiO based pigments. However, the present invention is not limited to these examples, but copper phthalocyanine is preferably listed.

The absorbance of said tinted sublayer 3 and protective layer 5, in the stimulating light peak wavelengths, can be determined, while the tinted area is exposed, by employing a spectrophotometer (for example, U-3300, manufactured by Hitachi Seisakusho). The protective layer of protective layer 5 is peeled off and the determination may be carried out utilizing an integrating sphere. On the other hand, stimulable phosphor layer 4 is peeled off to expose sublayer 3 which may be subjected to determination. Subsequently, by obtaining the ratio of the absorbance (reflection absorbance as well as transmission absorbance) in the stimulating light peak wavelengths of the measured value of absorbance to the absorbance of stimulated luminescence peak wavelengths, it is possible to confirm the desired effects of the present embodiment. Incidentally, when a phosphor having a plurality of peaks regarding stimulated luminescence wavelengths, the peak with the highest luminescence intensity is selected and the selected wavelength is utilized.

As described in the conventional techniques, Japanese Patent Publication Open to Public Inspection Nos. 59-42500 and 1-57759 disclose means to minimize image unevenness as well as linear noise by increasing the haze ratio of protective layer 5. However, said conventional techniques have resulted in degradation of sharpness. On the other hand, the present embodiments are capable of minimizing image unevenness as well as linear noise and of enhancing sharpness. Incidentally, when the haze ratio is less than 5 percent, said image unevenness as well as said linear noise is not effectively minimized. On the other hand, when the haze ratio is 60 percent or more, sharpness-enhancing effects decrease. Accordingly, said haze ratio is preferably from 5 to 60 percent, and is more preferably from 10 to 50 percent.

Further, Japanese Patent Publication Open to Public Inspection No. 59-23400 discloses a method for enhancing sharpness upon tinting a radiation image conversion panel in which various embodiments are described in which the support, and each of the sublayer, the phosphor layer, the interlayer and the protective layer are tinted. However, said patent publication neither describes nor suggests a specific protective film. Further, when the phosphor layer is simply tinted, the sharpness is improved while luminance is degraded, whereby the balance between the luminance and the sharpness is degraded.

In order to overcome said drawbacks, the inventor of the present invention made various investigations. As a result, it was verified that it was possible to simultaneously improve luminance and sharpness employing the following embodiment. Sublayer 3 and protective layer 5 were tinted so as to absorb stimulating light. When stimulating light transmission absorbance of protective layer 5 is compared to stimulating light reflection absorbance of laminated reflection layer 2/sublayer 3, setting was carried out to satisfy the condition of protective layer absorbance≦lower reflective layer/sublayer absorbance. By contrast, when the condition of protective layer absorbance>sublayer absorbance is satisfied, unevenness of luminance tends to occur, whereby it is difficult to obtain uniform images.

EXAMPLES

Example 1

In order to detail the aforementioned embodiments of the present invention, the example of the present invention will now be described with reference to Table 1. Table 1 shows the experimental results to confirm the effects of the radiation image conversion panel of the present example. Further, in the present example, described is the structure of each constituting component, the production method thereof, and the effects of the radiation image conversion panel of the present example.

Pigment Reflective Layer

Added to 100 g of titanium oxide, manufactured by Ishihara Sangyo Co. and 100 g of Bairon 630, manufactured by Toyobo Co. were methyl ethyl ketone so that the resulting coating composition exhibited a viscosity of 20 Ps (poise). The resulting mixture was dispersed for 10 hours employing a ball mill, whereby a reflective layer coating composition was prepared. Said reflective layer coating composition was applied onto carbon-containing black polyethylene terephthalate X30-100 support so as to obtain a dried layer thickness of 100 $\mu$m, employing a doctor blade, whereby a support with a pigment reflective layer was prepared.

Foamed Support

Utilizing methods described in Japanese Patent Publication Open to Public Inspection Nos. 3-76727 and 6-226894, air bubbles were incorporated into polyethylene terephthalate, whereby a support provided with a 200 $\mu$m thick reflective layer, comprised of said reflective layer dyes, was prepared.

Colored Sublayer: Stimulating Light Absorbing Layer A

Added to copper phthalocyanine, manufactured by Sanyo Shikiso Co. and Bairon 630, manufactured by Toyobo Co. were methyl ethyl ketone so that the resulting coating composition exhibited a viscosity of 20 Ps (poise) . The resulting mixture was dispersed for 10 hours employing a ball mill, whereby a stimulating light absorbing coating composition was prepared. Said stimulating light absorbing coating composition was applied onto said pigment reflective layer and said foamed support, employing a doctor blade. The mixing ratio of cupper phthalocyanine and Bairon was adjusted so as to achieve the thickness and reflectivity which are shown in Table 1.

Preparation of Protective Film

Employed as a protective layer on the phosphor surface of a phosphor sheet was VMPET12//VMPET12//PET12// sealant film (wherein PET represents polyethylene terephthalate; sealant film represents a heat fusible film such as CPP or casting polypropylene or LLDPE or low density linear polyethylene; VMPET represents a commercially available alumina-evaporated PET, manufactured by Toyo Metalizing Co.; and each figure following the type of film represents the layer thickness in $\mu$m).

Further, "//" as described above denotes a 2.5 $\mu$m thick dry lamination adhesive layer. Employed as dry lamination adhesive agents were two-liquid reaction type urethane based adhesive agents. A blue organic colorant (Zapon Fast Blue, manufactured by Hoechst AG), which had been dispersed into methyl ethyl ketone, was added to the employed adhesive agent solution, whereby the resulting adhesive agent layer was designated as Stimulating Light Absorbing Layer B. At the same time, the light transmission ratio of said Stimulating Light Absorbing Layer B was adjusted by varying the added amount.

Further, the light transmission ratio of the stimulating light absorbing layer, as described herein, refers to the ratio of the transmittance of an He—Ne laser beam at a wavelength of 630 nm through the protective layer, with or without the stimulating light absorbing layer. At the same time, laminated protective films having a different density and layer thickness were prepared by varying the dye concentration and layer thickness of Stimulating Light Absorbing Layer B.

Synthesis of Phosphors

The stimulable phosphor precursor of europium activated barium fluoride iodide was synthesized as follows. Charged into a reaction vessel were 2,780 ml of an aqueous $BaI_2$ solution (0.3 mol/liter) and 27 ml of an aqueous $EuI_3$ solution (0.2 mol/liter). While stirring, the reaction mother solution in said reaction vessel was maintained at 83° C. Subsequently, 322 ml of an aqueous ammonium fluoride solution (8 mol/liter) were poured into said mother solution employing a roller pump, whereby precipitates were formed. After the completion of pouring, the resulting precipitates underwent ripening for 2 hours while stirring and maintaining the temperature.

Subsequently, the resulting precipitates were collected through filtration, washed with ethanol, and dried, whereby europium activated barium fluoride iodide crystals were obtained. In order to minimize the variation of particle size distribution due to calcination during sintering, ultra-fine alumina particle powder was added in an amount of 0.2 percent by weight, and the resulting mixture was well stirred so that said ultra-fine alumina particle powder was adhered onto the surface of said crystals. A quartz boat was filled with the resulting mixture and calcined under an atmosphere of hydrogen gas at 850° C. for 2 hours in a tube furnace, whereby europium activated barium fluoride iodide phosphor particles were prepared. Subsequently said phosphor particles were classified to obtain particles having an average diameter of 7 $\mu$m.

As materials for forming a phosphor layer, 427 g of the europium activated barium fluoride iodide phosphor prepared as above, 15.8 g of a polyurethane resin, Desmolack 4125, (manufactured by Sumitomo Bayer Urethane Co.), and 2.0 g of a bisphenol A type epoxy resin were added to a solvent mixture of methyl ethyl ketone and toluene (at a ratio of 1:1), dispersed employing a propeller mixer, whereby a coating composition at a viscosity of 25 to 30 Ps (poise) was prepared. Said coating composition was applied onto a support with or without the reflective layer, employing a doctor blade, so as to obtain a specified dried layer thickness shown in Table 1. Thus a phosphor layer was formed.

Sealing of Phosphor Sheet

Figure 1:
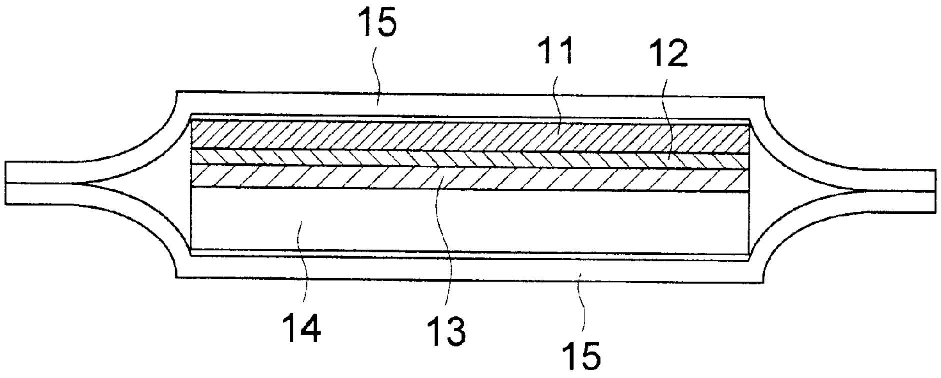
FIGS. 1*a* and 1*b* are schematic cross-sectional views showing a structure of the radiation image conversion panel according to one embodiment of the present invention.
Figure 1:
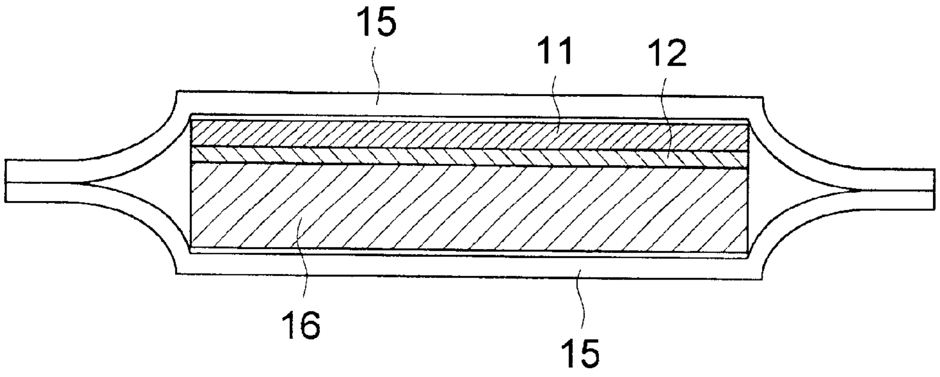

A coating sample was cut into a 20×20 cm square sheet, and the peripheral edges was sealed under reduced pressure employing an impulse sealer, by fusing each of said various laminated protective films having the stimulating light absorbing layer. Thus were obtained Examples 1 to 12 and Comparative Examples 1 to 7 which are shown in Table 1. The cross section of the radiation conversion panel of the present invention is shown in FIG. 1*a* and FIG. 1*b*.

Incidentally, fusing was carried out so that the distance between the fused area and the peripheral edges of said phosphor sheet was 1 mm. The width of the heater of the impulse sealer employed for fusing was 8 mm.

The absorbance can be measured with commonly used spectrometer, such as U-3300 manufactured by Hitachi Ltd. When cupper phthalocyanine was employed in the stimulating light absorbing layer of the present invention, the ratio of the stimulating light absorbance to the stimulating emission absorbance was 6:1, and when Zapon Fast Blue was employed, the ratio was 3.5:1.

Evaluation of Radiation Image Conversion Panel

The sharpness, image unevenness, linear noise, and luminance of the radiation image conversion panel prepared employing said method were evaluated. The results will be described with reference to Table 1.

Evaluation of Sharpness

Each of said radiation image conversion panels was exposed with X-rays at a tube voltage of 80 kVp through an MTF chart comprised of lead. Thereafter, the exposed panel was stimulated utilizing an He—Ne laser beam. Stimulated luminescence radiated from the phosphor layer was received employing the same light receiving device as above and converted to electrical signals, which were subjected to analog/digital conversion. Converted signals were recorded on a hard disk, and the modulation transfer function (MTF) of recorded X-ray images recorded on said hard disk were inspected while being analyzed utilizing a computer. In the sharpness column of Table 1, MTF in a space frequency of 1 cycle/mm is shown. The higher MTF is, the higher the sharpness value becomes. Further, herein, MTF is shown employing a relative value when the MTF of Comparative Example 1 is 100.

Evaluation of Image Unevenness and Linear Noise

Each of radiation image conversion panels was exposed with X-rays at a tube voltage of 80 kVp, and subsequently was stimulated, utilizing an He—Ne laser beam (having a wavelength of 633 nm). Stimulated luminescence radiated from the phosphor layer was received employing a light receiving device (a photomultiplier with spectral sensitivity S-5) and converted to electrical signals. Subsequently, said electrical signals were reproduced into images, utilizing an image reproduction device. Each of said reproduced images was printed under magnification at a factor of 2, employing an output device. Each of said resulting print images was visually observed and the image unevenness as well as the linear noise was evaluated. The state in which each of the image unevenness and linear noise was not formed was evaluated as 1, while the state in which each of them was markedly formed was evaluated as 4. The evaluation results are shown in the image unevenness column of in Table 1.

Evaluation of Luminance

Each of said radiation image conversion panels was exposed with X-rays at a tube voltage of 80 kVp, and subsequently stimulated, utilizing an He—Ne laser beam (having a wavelength of 633 nm). The intensity of photoluminescence radiated from the phosphor layer was determined employing a light receiving device (a photomultiplier). The luminance in Table 1 is the average of the entire surface of the radiation image conversion panel at a protective layer haze ratio of 40 percent, and is relative luminance when the luminance is 100, in which sealing was carried out employing the protective film without the stimulating light absorbing layer.

Table 1 is a list of experimental results showing the effects of the radiation image conversion panel according to one embodiment of the present invention.

TABLE 1

| | Support | Reflective Layer | Stimulating Light Absorbing Layer A | Thickness of the Layer A | Light Reflectivity of the Layer A |
|---|---|---|---|---|---|
| Comparative Example 1 | X30-100 | — | — | — | — |
| Comparative Example 2 | X30-100 | present | — | — | — |
| Comparative Example 3 | X30-100 | present | present | 20 | 95 |
| Example 1 | X30-100 | present | present | 20 | 95 |
| Example 2 | X30-100 | present | present | 20 | 95 |
| Comparative Example 4 | X30-100 | present | present | 20 | 95 |
| Example 3 | X30-100 | present | present | 40 | 95 |
| Example 4 | X30-100 | present | present | 60 | 95 |
| Comparative Example 5 | Foamed PET | — | — | — | — |
| Comparative Example 6 | Foamed PET | — | present | 20 | 95 |
| Example 5 | Foamed PET | — | present | 20 | 95 |
| Example 6 | Foamed PET | — | present | 20 | 95 |
| Comparative Example 7 | Foamed PET | — | present | 20 | 95 |
| Example 7 | Foamed PET | — | present | 40 | 95 |
| Example 8 | Foamed PET | — | present | 60 | 95 |
| Example 9 | Foamed PET | — | present | 20 | 60 |
| Example 10 | Foamed PET | — | present | 20 | 40 |
| Example 11 | Foamed PET | — | present | 20 | 95 |
| Example 12 | Foamed PET | — | present | 20 | 95 |

TABLE 1-continued

| | Protective Layer: Stimulating Light Absorbing Layer B | Thickness of the Layer B | Trans-mittance of the layer B | Luminance | Sharpness | Image Unevenness |
|---|---|---|---|---|---|---|
| Comparative Example 1 | — | — | — | 100 | 100 | 4 |
| Comparative Example 2 | — | — | — | 120 | 80 | 4 |
| Comparative Example 3 | — | — | — | 115 | 90 | 3 |
| Example 1 | present | 2 | 95 | 110 | 105 | 2 |
| Example 2 | present | 15 | 95 | 110 | 108 | 2 |
| Comparative Example 4 | present | 25 | 95 | 105 | 98 | 3 |
| Example 3 | present | 2 | 95 | 105 | 105 | 2 |
| Example 4 | present | 2 | 95 | 105 | 98 | 2 |
| Comparative Example 5 | — | — | — | 130 | 70 | 3 |
| Comparative Example 6 | — | — | — | 125 | 85 | 3 |
| Example 5 | present | 2 | 95 | 120 | 102 | 1 |
| Example 6 | present | 15 | 95 | 115 | 104 | 1 |
| Comparative Example 7 | present | 25 | 95 | 110 | 93 | 3 |
| Example 7 | present | 2 | 95 | 115 | 100 | 1 |
| Example 8 | present | 2 | 95 | 110 | 96 | 2 |
| Example 9 | present | 2 | 95 | 115 | 103 | 1 |
| Example 10 | present | 2 | 95 | 100 | 106 | 2 |
| Example 11 | present | 2 | 60 | 110 | 109 | 2 |
| Example 12 | present | 2 | 40 | 95 | 111 | 2 |

Example 2

An another samples were prepared according to the same way as in Example 1. The evaluation results are shown in Table 2.

Table 2 clearly shows that when judgment is carried out utilizing, as the standard, the luminance and the sharpness of Comparative Example 1, in which the reflective layer, the tinted sublayer and the protective layer tinted layer are not formed, one of the luminance and the sharpness of Comparative Examples 2, 3, 6, 7, 10, and 11 in which one of the tinted sublayer and the protective layer tinted layer is not formed, is superior to each of Comparative Example 1, while the other examples are inferior to each of the same. Further, in the same manner, either the luminance or the sharpness of Comparative Examples 4, 5, 8, and 9, in which the tinted sublayer and the protective layer tinted layer are formed and hold the relationship of protective layer absorbance>subbing absorbance, is superior to each of Comparative Example 1, while the other examples are inferior to each of the same. Accordingly, it is found that under said conditions, it is impossible to simultaneously improve both luminance and sharpness.

On the other hand, both luminance and sharpness of Examples 1 through 7, in which the tinted sublayer and the protective layer tinted layer are formed, and hold the relationship of protective layer absorbance≦subbing absorbance, are superior to those of Comparative Example 1 and both luminance and sharpness are improved. Accordingly, in order to improve both luminance and sharpness, it is essential to adjust the tinting degree of the sublayer and the protective layer so that the relationship of protective layer absorbance≦subbing absorbance is held.

Further, when Examples 4, 7, and 8, in which the thickness of the stimulable phosphor layer is varied, are compared to each other, the sharpness of the sample, having a relatively large layer thickness of 280 μm, tends to be degraded due to the spread of the stimulating light in the interior of the stimulable phosphor layer. Accordingly, the thickness of the stimulable phosphor layer is preferably no more than about 230 μm. However, taking into account any errors in the production process, the thickness of the stimulable phosphor layer is preferably no more than about 250 μm.

Still further, regarding the structure of the support, when foamed PET (shown in Examples 4 through 6), provided with the function of a reflective layer, is employed, it is possible to effectively reflect the stimulated luminescence without providing a separate reflective layer, whereby the luminance is improved compared to the structures provided with the reflective layer (shown in Examples 1 through 3). Thus it is found that said foamed PET exhibits excellent characteristics as the support. Further, though not shown in Table 2, according to the experiments performed by the inventors of the present invention, the following was confirmed. When the absorbance of the colorant, employed to tint the sublayer and the protective layer at the stimulating light peak wavelength, exceeds that at the stimulated luminescence peak wavelength and the resulting ratio is at least 3, it is possible to effectively improve the sharpness without degrading the luminance.

TABLE 2

| | Support | Reflective Layer | Phosphor Layer Thick-ness | Tinted Sublayer | Subbing Absorbance |
|---|---|---|---|---|---|
| Comparative Example 1 | X30 | — | 230 | — | — |
| Comparative | X30 | present | 230 | — | — |

TABLE 2-continued

| | | | | | |
|---|---|---|---|---|---|
| Example 2 | | | | | |
| Comparative Example 3 | X30 | present | 230 | present | 0.3 |
| Example 1 | X30 | present | 230 | present | 0.3 |
| Example 2 | X30 | present | 230 | present | 0.3 |
| Comparative Example 4 | X30 | present | 230 | present | 0.3 |
| Example 3 | X30 | present | 230 | present | 0.2 |
| Comparative Example 5 | X30 | present | 230 | present | 0.08 |
| Comparative Example 6 | Foamed PET | — | 230 | — | — |
| Comparative Example 7 | Foamed PET | — | 230 | present | 0.3 |
| Example 4 | Foamed PET | — | 230 | present | 0.3 |
| Example 5 | Foamed PET | — | 230 | present | 0.3 |
| Comparative Example 8 | Foamed PET | — | 230 | present | 0.3 |
| Example 6 | Foamed PET | — | 230 | present | 0.2 |
| Comparative Example 9 | Foamed PET | — | 230 | present | 0.08 |
| Comparative Example 10 | Foamed PET | — | 180 | — | — |
| Example 7 | Foamed PET | — | 180 | present | 0.3 |
| Comparative Example 11 | Foamed PET | — | 280 | — | — |
| Example 8 | Foamed PET | — | 280 | present | 0.3 |

| | Protective Layer Tinted Layer | Protective Layer Absorbance | Luminance | Sharpness | Image Unevenness |
|---|---|---|---|---|---|
| Comparative Example 1 | — | — | 100 | 100 | 3 |
| Comparative Example 2 | — | — | 125 | 83 | 3 |
| Comparative Example 3 | — | — | 118 | 92 | 3 |
| Example 1 | present | 0.1 | 110 | 102 | 3 |
| Example 2 | present | 0.2 | 106 | 104 | 3 |
| Comparative Example 4 | present | 0.4 | 99 | 106 | 1 |
| Example 3 | present | 0.1 | 113 | 101 | 3 |
| Comparative Example 5 | present | 0.1 | 117 | 97 | 2 |
| Comparative Example 6 | — | — | 136 | 72 | 3 |
| Comparative Example 7 | — | — | 128 | 86 | 3 |
| Example 4 | present | 0.1 | 121 | 100 | 3 |
| Example 5 | present | 0.2 | 117 | 102 | 3 |
| Comparative Example 8 | present | 0.4 | 110 | 98 | 1 |
| Example 6 | present | 0.1 | 124 | 100 | 3 |
| Comparative Example 9 | present | 0.1 | 126 | 96 | 2 |
| Comparative Example 10 | — | — | 83 | 107 | 3 |
| Example 7 | present | 0.1 | 100 | 105 | 3 |
| Comparative Example 11 | — | — | 121 | 93 | 3 |
| Example 8 | present | 0.1 | 130 | 89 | 3 |

As described above, by employing the radiation image conversion panel of the present invention, it is possible to minimize degradation of sharpness due to diffusion of a stimulating laser beam and also to enhance luminance.

What is claimed is:

1. A radiation image conversion panel comprising, (i) a phosphor sheet which contains a support having thereon a stimulating light absorbing layer (A) being colored to absorb the stimulating light, and a stimulable phosphor layer in order; and (ii) a protecting layer which covers the stimulable phosphor layer of the phosphor sheet, wherein the protective layer comprises a stimulating light absorbing layer(B) being colored to absorb the stimulating light, and the layers(A) and (B) each have a smaller absorbance at a peak wavelength of a stimulated emission than an absorbance at a peak wavelength of the stimulating light, and a thickness of the layer(A) is larger than a thickness of the layer(B); further comprising a reflective layer between the support and the stimulating light absorbing layer(A), and wherein (i) a sum of a light reflectivity of a section having the reflective layer and the stimulating light absorbing layer(A) at the peak wavelength of the stimulating light is 50 to 97% of the light reflectivity of the reflective layer; and (ii) the thickness of the reflective layer is between 2 and 50 $\mu$m.

2. The radiation image conversion panel of claim 1, wherein the stimulable phosphor layer comprises BaFI activated with Eu.

3. The radiation image conversion panel of claim 1, wherein a haze ratio of the protecting layer is 5 to 600.

4. A radiation image conversion panel comprising, (i) a phosphor sheet which contains a support having thereon a stimulating light absorbing layer (A) being colored to absorb the stimulating light, and a stimulable phosphor layer in order; and (ii) a protecting layer which covers the stimulable phosphor layer of the phosphor sheet, wherein the protective layer comprises a stimulating light absorbing layer(B) being colored to absorb the stimulating light, and the layers(A) and (B) each have a smaller absorbance at a peak wavelength of a stimulated emission than an absorbance at a peak wavelength of the stimulating light, and a thickness of the layer(A) is larger than a thickness of the layer(B), and wherein a light transmittance of a section having the protecting layer comprising the stimulating light absorbing layer(B) at the peak wavelength of the stimulating light is 50 to 97% of the light transmittance of a protecting layer having no stimulating light absorbing layer(B).

5. The radiation image conversion panel of claim 4, wherein the stimulable phosphor layer comprises BaFI activated with Eu.

6. A radiation image conversion panel comprising, (i) a phosphor, sheet which contains a support having thereon a stimulating light absorbing layer(A) being colored to absorb the stimulating light, and a stimulable phosphor layer in order; and (ii) a protecting layer which covers the stimulable phosphor layer of the phosphor sheet, wherein the protective layer comprises a stimulating light absorbing layer(B) being colored to absorb the stimulating light, and the layers(A) and (B) each have a smaller absorbance at a peak wavelength of a stimulated emission than an absorbance at a peak wavelength of the stimulating light, and a thickness of the layer(A) is larger than a thickness of the layer(B) further comprising a reflective layer between the support and the stimulating light absorbing layer(A), and wherein the stimulating light absorbing layer(A) is a sublayer of the stimulable phosphor layer and a reflected absorbance of the stimulating light in a section comprising the reflective layer and the sublayer is larger than a transmission absorbance of the stimulating light in the protective layer.

7. The radiation image conversion panel of claim 6, wherein a second stimulating light absorbing layer is contained in the protective layer or a second stimulating light absorbing layer is provided on one side of the support, or the support is colored to absorb the stimulating light.

8. A radiation image conversion panel comprising, (i) a phosphor sheet which contains a support having thereon a stimulating light absorbing layer(A) being colored to absorb the stimulating light, and a stimulable phosphor layer in order; and (ii) a protecting layer which covers the stimulable phosphor layer of the phosphor sheet, wherein the protective layer comprises a stimulating light absorbing layer(B) being colored to absorb the stimulating light, and the layers(A) and (B) each have a smaller absorbance at a peak wavelength of a stimulated emission than an absorbance at a peak wavelength of the stimulating light, and a thickness of the layer(A) is larger than a thickness of the layer(B), and wherein the stimulating light absorbing layer (A) is a sublayer of the stimulable phosphor layer and a reflected absorbance of the stimulating light in a section comprising the reflective layer and the sublayer is larger than a transmission absorbance of the stimulating light in the protective layer.

9. A radiation image conversion panel comprising, (i) a phosphor sheet which contains a support having thereon a stimulating light absorbing layer(A) being colored to absorb the stimulating light, and a stimulable phosphor layer in order; and (ii) a protecting layer which covers the stimulable phosphor layer of the phosphor sheet, wherein the protective layer comprises a stimulating light absorbing layer(B) being colored to absorb the stimulating light, and the layers(A) and (B) each have a smaller absorbance at a peak wavelength of a stimulated emission than an absorbance at a peak wavelength of the stimulating light, and a thickness of the layer(A) is larger than a thickness of the layer(B), and wherein a ratio of an absorbance in the range of an average wavelength of the stimulated light to an average wavelength of the stimulated emission is not less than 3.

* * * * *